United States Patent Office 2,982,117
Patented May 2, 1961

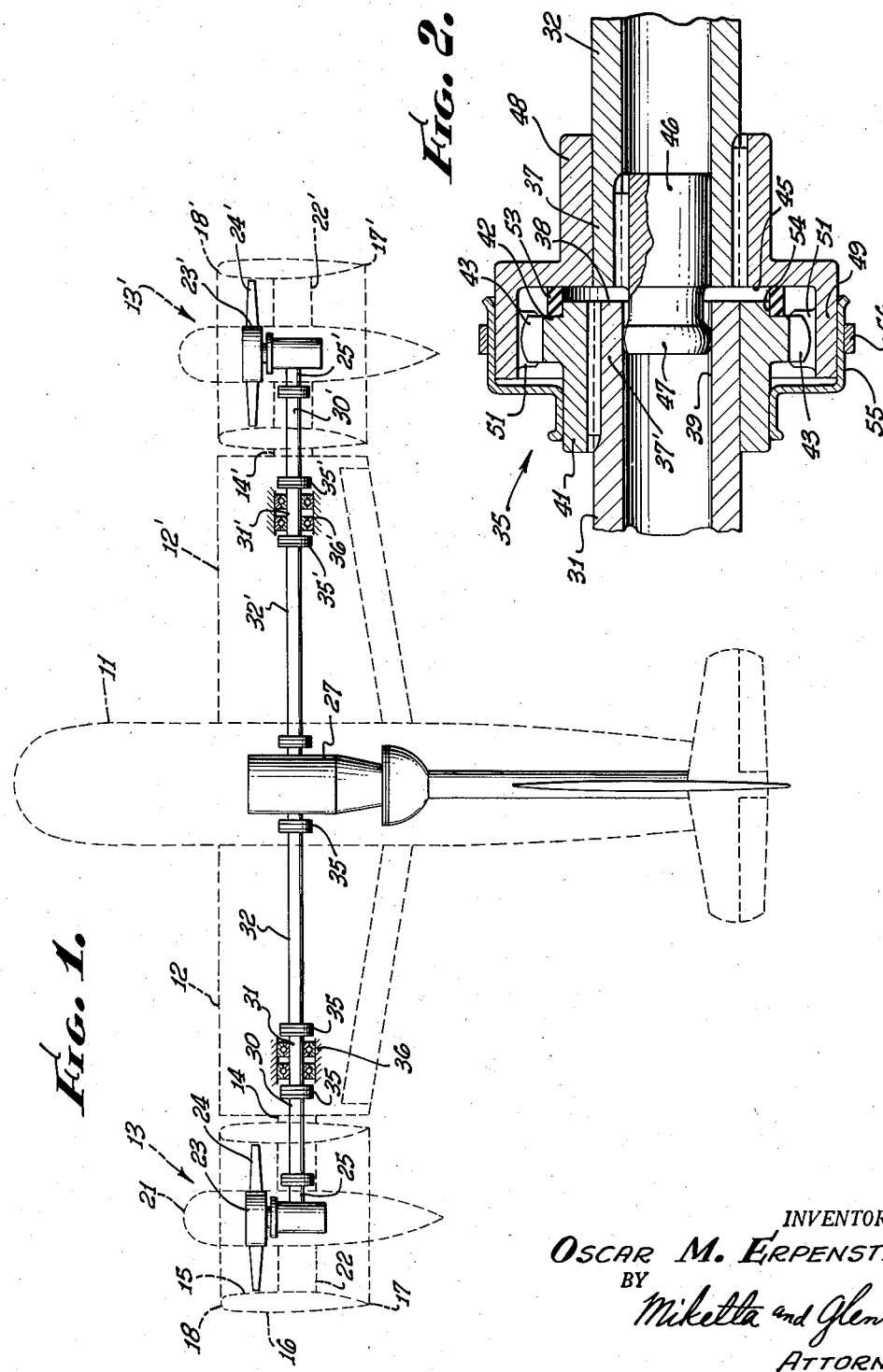

2,982,117

FLEXIBLE DRIVE SHAFT ASSEMBLY

Oscar M. Erpenstein, Millbrae, Calif., assignor to Doak Aircraft Co., Inc., Torrance, Calif., a corporation of California Filed Oct. 5, 1959, Ser. No. 844,385

6 Claims. (Cl. 64—9)

This invention relates to a flexible drive shaft assembly for effective transmission of torque between zones subject to relative displacement.

In many instances, it is required that a drive shaft assembly continuously transmit torque between spaced zones while being capable of flexing and varying in length. The present invention provides such an assembly and without being limited thereto will be described in connection with a vertical take-off aircraft having a single engine carried in the fuselage and a thrust-propulsion unit rotatably carried by the lateral extremity of each wing. A propeller or multibladed fan is axially mounted in each rotatable unit and is driven by the single engine located in the fuselage. Such a vertical take-off aircraft is disclosed in application Serial No. 472,313, filed December 1, 1954, now abandoned, by Edmond R. Doak. This type of vertical take-off aircraft can rise vertically and when airborne rotate its thrust-propulsion units into the horizontal position and fly at high forward speed. In either the vertical or horizontal positions, the propellers in the thrust-propulsion units are driven by the single engine.

A drive shaft assembly is provided on either side of the single engine and within each wing for transmitting torque to each of the propellers within the units. The zone surrounding the engine in the fuselage and the zone surrounding a propeller within a thrust-propulsion unit are subject to relative displacement.

This is due to varying loads and deflections on the wing caused by rotation of the thrust propulsion unit or due to thermal expansion of different materials in the wing and drive shaft assembly. Therefore, since the engine zone and propeller zone are adapted to be relatively displaced with respect to each other, a rigid drive shaft assembly would be subjected to bending stresses and would ultimately fail.

The present flexible drive shaft assembly comprises a plurality of drive shaft sections in virtual alignment between the engine and propeller, and adjoining ends of successive drive shaft sections are provided with male and female coupling ends forming a flexible coupling. The flexible coupling of the present invention allows the drive shaft assembly to flex with deflections of the wing under varying loads and vary in length when the wing is placed under lateral tensioin or compression. Therefore, the axes of successive drive shaft sections may be angularly displaced and the ends of successive drive shaft sections may be axially displaced while the assembly continuously transmits torque. However, the novel flexible coupling of the present invention prevents the axes of the drive shaft sections from being offset in parallel relationship as will be obvious from the following detailed description.

An object of the present invention is to provide a drive shaft assembly for effective transmission of torque between zones subject to relative displacement.

Another object is to provide a drive shaft assembly capable of flexing and varying in length while continuously transmitting torque.

A further object of the invention is to provide a novel flexible coupling between successive drive shaft sections where the axes of the drive shaft sections are adapted to be angularly displaced, the ends of the drive shaft sections may be axially displaced but the axes of the drive shaft sections are prevented from being offset in parallel relationship.

Still another object is to provide a novel flexible coupling adapted to be used between successive drive shaft sections.

Other objects and advantages of the invention will be readily apparent from the following description when considered in connection with the appended drawings.

In the drawings:

Fig. 1 is a schematic plan view of a vertical take-off aircraft having thrust-propulsion units rotatably carried at the extremities of the wings and drive shaft assemblies interconnecting the single engine and the propellers in each of the units.

Fig. 2 is a longitudinal section of a flexible coupling forming part of the drive shaft assembly in Fig. 1.

An exemplary device, such as the vertical take-off aircraft in Fig. 1 may be provided with the present invention. Such an aircraft has a fuselage 11 and transverse, laterally extending wings 12 and 12'. The lateral extremity of each of the wings 12 and 12' rotatably carries a thrust-propulsion unit 13 and 13', respectively, which are adapted to be rotated between a horizontal position and vertical position by means of a trunnion 14 and 14', respectively.

Each unit comprises an open-ended tubular duct having a wall, in section, of airfoil configuration. The wall comprises an inner surface 15 and outer surface 16 merging at their ends to form a trailing edge 17 and a rounded frontal portion 18. A hollow streamlined fairing 21 is axially carried within the duct and rigidly supported by a series of radially extending hollow supporting ribs 22.

The fairing 21 rotatably carries a hub 23 having a plurality of radially extending blades 24 forming a propeller or multibladed fan. Suitable gear boxes, shafts, and a stub shaft 25 are carried and supported within the hollow fairing 21 for rotating the propeller. It can therefore be understood that air can be drawn into the ducted-propulsion unit when the propeller is rotated to produce the necessary thrust for propelling the aircraft. When the units 13 and 13' are in the vertical position, the aircraft can rise vertically and hover. Once airborne, the aircraft is adapted to fly horizontally by rotation of the units 13 and 13' into the horizontal position.

A single engine 27 is provided within the fuselage for driving the propellers in each of the thrust propulsion units 13 and 13'. The zone immediately around the engine 27 and the zone at the lateral extremity of each wing are subject to relative displacement due to varying loads caused by rotation of the units 13 and 13' and thermal expansion of the members forming the drive shaft assembly. Therefore a rigid drive shaft assembly between the engine zone and the rotatable duct zone would be constantly subjected to stresses and strains and ultimately would fail.

The present invention provides a flexible drive shaft assembly for effective transmission of torque between the engine zone and the duct zones at the lateral extremity of the wings. The assembly comprises a plurality of tubular drive shaft sections 30, 31 and 32 in virtual alignment between the zones subject to relative displacement. Adjoining ends of the successive drive shaft sections are connected by means of a flexible coupling 35 having male and female coupling members. With this arrangement, it is preferred that at least one of the plurality of drive shaft sections is rotatably supported by bearings carried by an external support. As shown, section 31 may be so supported by bearings 36 carried by the wing structure. The shaft sections 30 and 32 can therefore be said to be floating sections.

As each of the flexible couplings 35 is substantially the same, a detailed description of one will be sufficient for one skilled in the art to fully understand the invention. Fig. 2 shows a section of the coupling 35 interconnecting the adjoining ends of drive shaft sections 31 and 32, a male end 37' being provided on section 31 and a female end 37 on section 32.

The male end 37' of the drive shaft section 31 may include an end face 38, an axial recess 39 having a cylindrical internal surface and a radially extending flange 41 having an annular thrust-receiving face 42. The flange 41 may be integral with or rigidly connected to the shaft 31 by a key, splines or any other suitable means. The end face 38 may be considered as extending transversely along the flange 41 and drive shaft section 31, both of which comprise the male end 37' of the drive shaft. The perimeter of the flange 41 is provided with a plurality of radially extending, circumferentially spaced teeth 43.

The female coupling end 37 of the adjoining drive shaft section 32 may include a thrust-receiving end face 45 and an axially disposed centering pin 46 extending beyond the end of the drive shaft section 32. A spline or key connection may be utilized for rigidly securing the pin 46 within the shaft 32. The pin 46 may include an enlarged head 47 having a spherical surface adapted to extend into the recess 39 of the male end portion 37' of the section 31. A radial flange 48 may be an integral part of the male end portion 37' or may be rigidly secured thereon by a key, splines or other well known means. The inner surface of flange 48 is in alignment with the end of shaft 32 and constitutes a continuation of the thrust-receiving face 45.

The flange 48 is provided with a cylindrical lip 49 extending outwardly beyond the thrust-receiving end face 45 and has a plurality of inwardly extending teeth 51 adapted to mesh with the teeth 43 on the male end flange 41. It is preferred that the crowns of teeth 43 and 51 are rounded to prevent binding when the axes of sections 31 and 32 are inclined with each other.

An annular, compressible and resilient thrust ring 53 of larger diameter than the axial recess 39 is positioned between the thrust-receiving faces 42 and 45 of the male and female drive shaft sections. Suitable means may be carried by one of the thrust-receiving faces for cooperating with the ring 53 to hold the same coaxial with the recess 39 and pin 46. As shown, the male flange 41 may have a recessed portion providing an annular shoulder 54 for carrying the ring 53. It is understood that the ring 53 is in axial compression when the drive shaft sections 31 and 32 are interconnected by interengagement of the teeth 43 and 51.

A relatively thin, flexible, external protective boot 55 may extend from the cylindrical lip 49 to the male flange 41 to prevent dirt and dust from entering and interfering with the operation of the teeth 43 and 51. A resilient spring-like clamping band 56 may be used to hold the booth 55 on the lip 49.

It can thus be understood that the flexible coupling 35 will continuously transmit driving torque from one shaft section to another while compensating for various types of axial misalignments. The coupling allows for angular displacement between the ends of adjoining shaft sections, for angular displacement of the axes of adjoining shaft sections, but due to the centering guide pin 46 the axes of adjoining shaft sections are prevented from being offset from each other in parallel relationship.

Moreover thrust-receiving faces 42 and 45 are not susceptible to being damaged due to the resilient ring 53.

The present invention therefore provides a flexible drive shaft assembly that is adapted to flex with the deflections of the wing under varying loads, and to have its length vary due to structural deflections under flight loads or to differences in material with resultant differences in thermal expansion. Yet the assembly continuously transmits torque at speeds greater than 6,000 r.p.m.

Obviously many modifications and variations of the present invention are possible in the light of the above teachings. For example, the centering pin 46 may be secured within the shaft 31 and the axial recess may be provided in shaft 32. It is therefore to be understood that within the scope of the appended claims the invention may be practiced otherwise than as specifically described.

I claim:
1. A drive shaft assembly for effective transmission of torque between zones subject to relative displacement, comprising: a plurality of drive shaft sections in virtual alignment between spaced zones subject to relative displacement, adjoining ends of successive drive shaft sections being provided with male and female ends; the male end of a drive shaft section including an end face, an axial recess having a cylindrical internal surface and a radially extending flange having a thrust-receiving face, the perimeter of said flange being provided with a plurality of radially extending, spaced teeth; the female end of an adjoining drive shaft section including a thrust-receiving end face, an axially disposed centering pin carried by the drive shaft section and provided with an enlarged head having a spherical surface, said head being adapted to extend into the recess of the male end portion of an adjoining drive shaft section, and a radial flange carried by the female end, said flange being provided with a cylindrical lip extending outwardly beyond the thrust-receiving end face and having a plurality of inwardly extending teeth adapted to mesh with the teeth on said male end flange; an annular, compressible and resilient thrust ring of larger diameter than said axial recess positioned between the thrust-receiving faces of said male and female drive shaft sections; and means carried by one of said thrust-receiving faces cooperating with said ring to hold the same coaxial with said recess and pin, said ring being in axial compression when said drive shaft sections are interconnected by interengagement of said teeth.

2. An assembly as stated in claim 1, wherein at least one of said plurality of drive shaft sections is rotatably supported by bearings carried by an external support.

3. An assembly as stated in claim 1, wherein said drive shaft sections are tubular and said flanges are rigidly connected to end portions of their respective drive shaft sections.

4. An assembly as stated in claim 1, including a relatively thin, flexible, external protective boot extending from the cylindrical lip to said male section.

5. In a drive shaft assembly for effective transmission of torque between zones subject to relative displacements, a flexible coupling comprising: a pair of coupling members interposed between successive drive shaft sections of the assembly, each of said coupling members having an opposed thrust-receiving face, one of said coupling members having an axial recess and the other coupling member having an axially disposed centering pin with an enlarged head having a spherical surface adapted to extend into said axial recess; the perimeter of one of said coupling members being provided with a plurality of outwardly extending, spaced teeth, the other coupling member being provided with a radial flange having a cylindrical lip extending outwardly beyond said teeth and having a plurality of inwardly extending teeth adapted to mesh with said outwardly extending teeth; an annular, compressible and resilient thrust ring of larger diameter than said axial recess positioned between said thrust-receiving faces of said coupling members; and means carried by one of said thrust-receiving faces for holding said ring coaxial with said recess and pin, said ring being in axial compression when said teeth are in mesh.

6. In a drive shaft assembly as stated in claim 5, including a relatively thin, flexible external protective boot extending from the cylindrical lip to said coupling member having outwardly extending teeth.

References Cited in the file of this patent

UNITED STATES PATENTS

| | | |
|---|---|---|
| 2,565,770 | Johnson | Aug. 28, 1951 |
| 2,823,527 | Belden et al. | Feb. 18, 1958 |
| 2,845,781 | O'Brien | Aug. 5, 1958 |

FOREIGN PATENTS

| | | |
|---|---|---|
| 404,713 | France | Dec. 10, 1909 |